United States Patent
Madan et al.

(10) Patent No.: US 11,500,813 B2
(45) Date of Patent: Nov. 15, 2022

(54) INSTANT REPLAY OF A FILE TO A CLOUD TIER ON A DEDUPLICATION FILE SYSTEM

(71) Applicant: EMC IP Holding Company LLC, Hopkinton, MA (US)

(72) Inventors: Nitin Madan, Gurgaon (IN); Kedar Godbole, Pune (IN); Srikant Viswanathan, Pune (IN); Bhimsen Bhanjois, Fremont, CA (US); Kalyan Gunda, Bangalore (IN); Kalidas Balakrishnan, San Jose, CA (US); Vivek Nambiar, Bangalore (IN); Chetan Risbud, Pune (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 296 days.

(21) Appl. No.: 16/179,220

(22) Filed: Nov. 2, 2018

(65) Prior Publication Data
US 2020/0142970 A1    May 7, 2020

(51) Int. Cl.
*G06F 16/11*   (2019.01)
*H04L 67/1097*   (2022.01)
*G06F 16/174*   (2019.01)
*G06F 16/182*   (2019.01)

(52) U.S. Cl.
CPC ........ *G06F 16/122* (2019.01); *G06F 16/1748* (2019.01); *G06F 16/1824* (2019.01); *H04L 67/1097* (2013.01)

(58) Field of Classification Search
CPC .............. G06F 16/122; G06F 16/1748; G06F 16/1824; H04L 67/1097
USPC ........................................ 707/694
See application file for complete search history.

(56) References Cited

U.S. PATENT DOCUMENTS 9,594,674 B1 *   3/2017   Mondal .............. G06F 16/1748
9,715,434 B1 *   7/2017   Xu .......................... G06F 3/067
9,965,203 B1 *   5/2018   Agarwala ........... G06F 16/1748

* cited by examiner

*Primary Examiner* — Hosain T Alam
*Assistant Examiner* — Tracy M McGhee
(74) *Attorney, Agent, or Firm* — Staniford Tomita LLP

(57) ABSTRACT

Embodiments of an instant recall process and system for long-term data stored on a cloud storage tier. Embodiments include saving a content handle of a file in a cloud storage tier as an extended attribute in a single file system namespace; moving the file from the cloud storage tier to an active storage tier for data processing; recalling the file from the active storage tier to the cloud storage tier upon completion of the data processing; using the content handle from hidden metadata for a working copy of the file; and saving a hash of a segment reference as part of the extended attribute.

19 Claims, 6 Drawing Sheets

INSTANT REPLAY OF A FILE TO A CLOUD TIER ON A DEDUPLICATION FILE SYSTEM

TECHNICAL FIELD

This invention relates generally to deduplication storage systems, and more particularly to systems and methods for efficient saving/restoration of files to and from long-term storage networks, such as cloud-based storage.

BACKGROUND OF THE INVENTION

Cloud computing provides a shared pool of configurable computing resources (e.g., computer networks, servers, storage, applications and services) that can be rapidly provisioned and released with minimal management effort. Cloud computing allows users with various capabilities to store and process their data in either a private cloud or public cloud (e.g., third-party owned cloud network) in order to make data accessing mechanisms much more easy and reliable. Large-scale cloud computing infrastructure and services are often provided by cloud providers that maintain data centers that may be located long distances from many of the users. Cloud networks are widely used for large-scale data backup operations by enterprises that process large amounts of data on a regular basis, such as weekly or daily company-wide backups. Cloud storage (the "cloud tier") is typically associated with long-term storage of data that is stored for archival purposes and infrequently accessed, while local network storage (the "active tier") is associated with presently processed data.

Data deduplication is a form of single-instance storage that eliminates redundant copies of data to reduce storage overhead. Data compression methods are used to store only one unique instance of data by replacing redundant data blocks with pointers to the unique data copy. As new data is written to a system, duplicate chunks are replaced with these pointer references to previously stored data. Though storage requirements are greatly reduced, processing overhead is increased through the processes of deduplication. Certain deduplication file systems (e.g., EMC Data Domain) implement a multi-tiered deduplication file system that allows files to be moved between cloud and active tiers, while maintaining one namespace. The location of the file is strictly binary in that it is either in the active tier or on the cloud tier. Such systems may use certain tagging and filtering processes to allow temporary movement of data between the active and cloud tiers.

Present multi-tier data storage methods have certain drawbacks. For example, filtering to the cloud tier would not be necessary if the system remembered the old content handle in the cloud tier. Secondly, if a garbage collection process is initiated after the file was moved to the active tier but before the file was moved back to the cloud tier, it would clean up segments corresponding to the file. This would result in extra cost for the customer, as cloud providers usually charge a fee for ingress and egress. Regardless of whether the segments are in cloud, the filtering exercise is expensive; and if the locality of the file is bad, the data is written to the cloud tier, even if not required. Finally, if the only copy of this (recalled) file is on the active tier and the site crashes, the customer's only long term copy would be lost.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
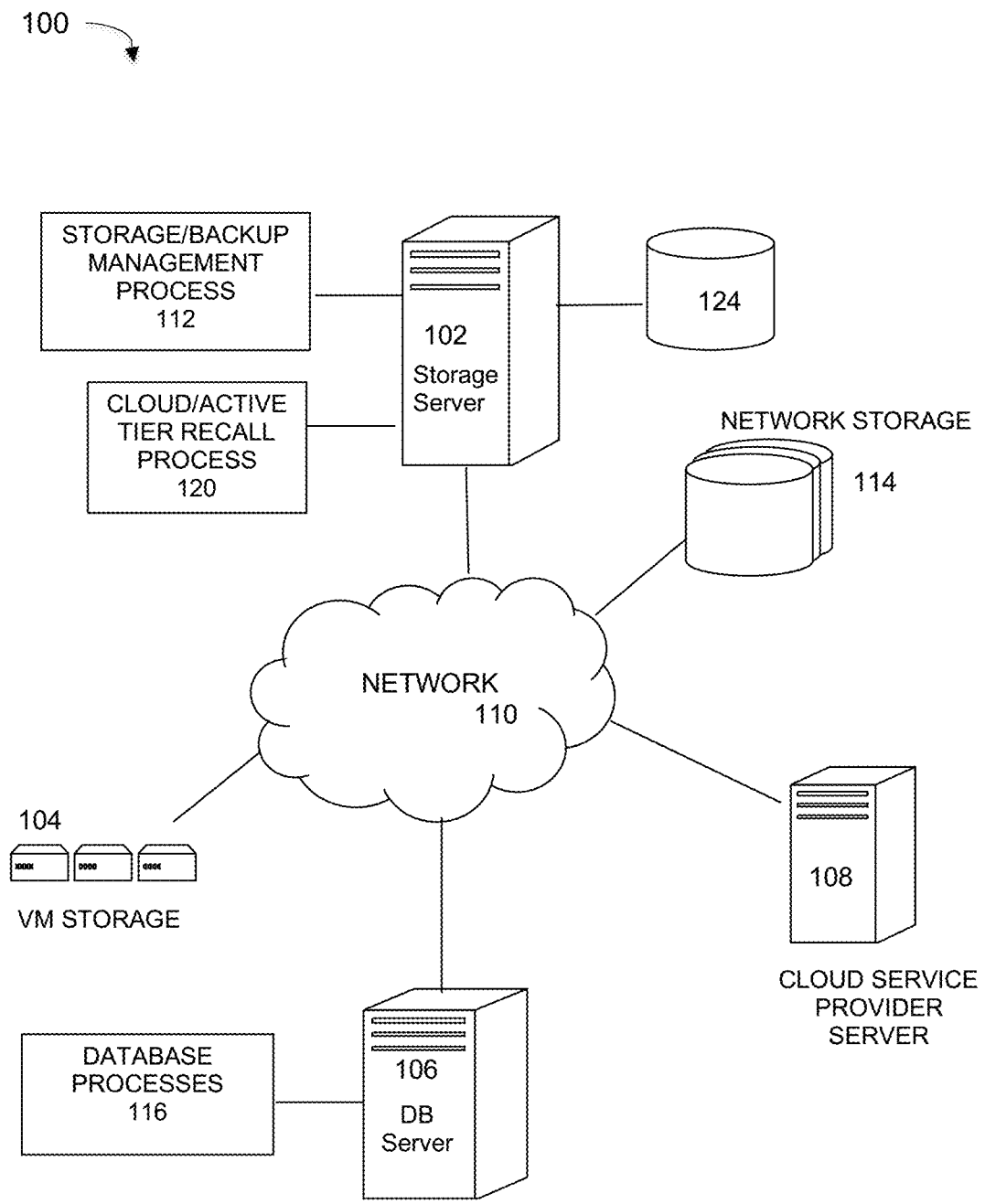
FIG. 1 is a diagram of a cloud computing network implementing an instant replay process for moving a file to a cloud tier in a deduplication storage system, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a network tuning process for allowing for instant recall (or replay) of files from the cloud storage tier to the active storage tier, so as to minimize data transfer and data vulnerability in deduplication backup systems. FIG. 1 illustrates a computer network system that implements one or more embodiments of a cloud storage network system implementing an instant replay (or "recall") process, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 114, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 106, in the network environment. The data sourced by the data source may be any appropriate data, such as database data that is part of a database management system, and the data may reside on one or more hard drives for the database(s) in a variety of formats. Thus, data source 106 maybe a database server executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

In an embodiment, cloud network 110 may be a private network or it may be a public network provided by a third-party cloud service provider (CSP). In this case, at least part of the infrastructure of network 110, such as servers, routers, interfaces and so on are provided to users such as storage server 102 as an IaaS (Infrastructure as a Service), SaaS (Software as a Service), PaaS (Platform as a Service), or other type of arrangement. CSP's typically provide service under a service level agreement (SLA) that establishes the terms and costs to use the network and transmit/store data specifies minimum resource allocations (e.g., storage space) and performance requirements (e.g., network bandwidth) provided by the provider. The cloud service provider server 108 may maintained be any company such as Amazon, EMC, Apple, Cisco, Citrix, IBM, Google, Microsoft, Salesforce.com, and so on. Depending on implementation, each cloud provider may show up as a cloud tier inside the file system for the user, such as the Data Domain file system. The cloud tier will have one or more cloud units that are used for data migration and storage using migration, copying, duplication, long-term retention (LTR), and other processes.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, the storage server 102 also executes a recall process that provides instant recall of data to the cloud tier from the active tier. Embodiments of the cloud tier/active tier recall process 120 essentially facilitate the movement of data to and from the active storage tier, which may be embodied as local storage 124 (or other readily accessible storage) and cloud storage, which may be embodied as storage media within the cloud 110 or other networked storage 114 or VM storage 104. For purposes of this description, cloud tier storage refers to network or cloud implemented storage media that is used to store data for archival or long-term storage purposes and that imposes a cost in terms of provider fees and/or resource overhead to access; while active tier storage refers to storage that may be faster and smaller than cloud storage, but that is readily accessible and used for temporary storage or present processing of data. The location of a file is strictly binary in that it is either in the active tier or on the cloud tier. The operation to move files to the cloud tier is called cloud data movement, and the operation to get the file back from the cloud is called recall. Because this process involves the ready availability of data, it is referred to interchangeably as either a data recall or replay process.

In present cloud/active data movement processes, data recall entails starting a job, wherein the segments corresponding to the file are filtered against the active tier, and the unique segments (i.e., segments that are not present on the active tier), are read from the cloud tier. Once the active tier file is complete, the namespace now points at the segment tree in the active tier. The segments are arranged in a tree, pointed by a content handle, which is inserted in the namespace. The files which are in the cloud tier are generally tagged important for long term retention, i.e., they are important for business continuity or for legal requirements, such as minimum retention periods. The files are usually recalled for the same reason, such as where old records are deemed important to restore. This implies that recalling a file is temporary, and once the record is read off the data domain appliance it is then moved back to the cloud tier for long-term storage after a certain period of time. The data movement engine does the "filtering" against the cloud tier segments to copy the file over back to the cloud tier. So, the assumption is that after the recall operation, the intention of the customer is almost always to move the file back to the cloud tier.

As mentioned in the background section, present multi-tier methods have certain issues, however. For example, filtering to the cloud tier is not necessary if the system remembered the old content handle in the cloud tier; any garbage collection process initiated after the file was moved to the active tier but before the file was moved back to the cloud tier would clean up segments corresponding to the file, resulting in extra long-term storage access. Furthermore, if the only copy of the recalled file is on the active tier, a system crash would result in data loss.

Figure 2:
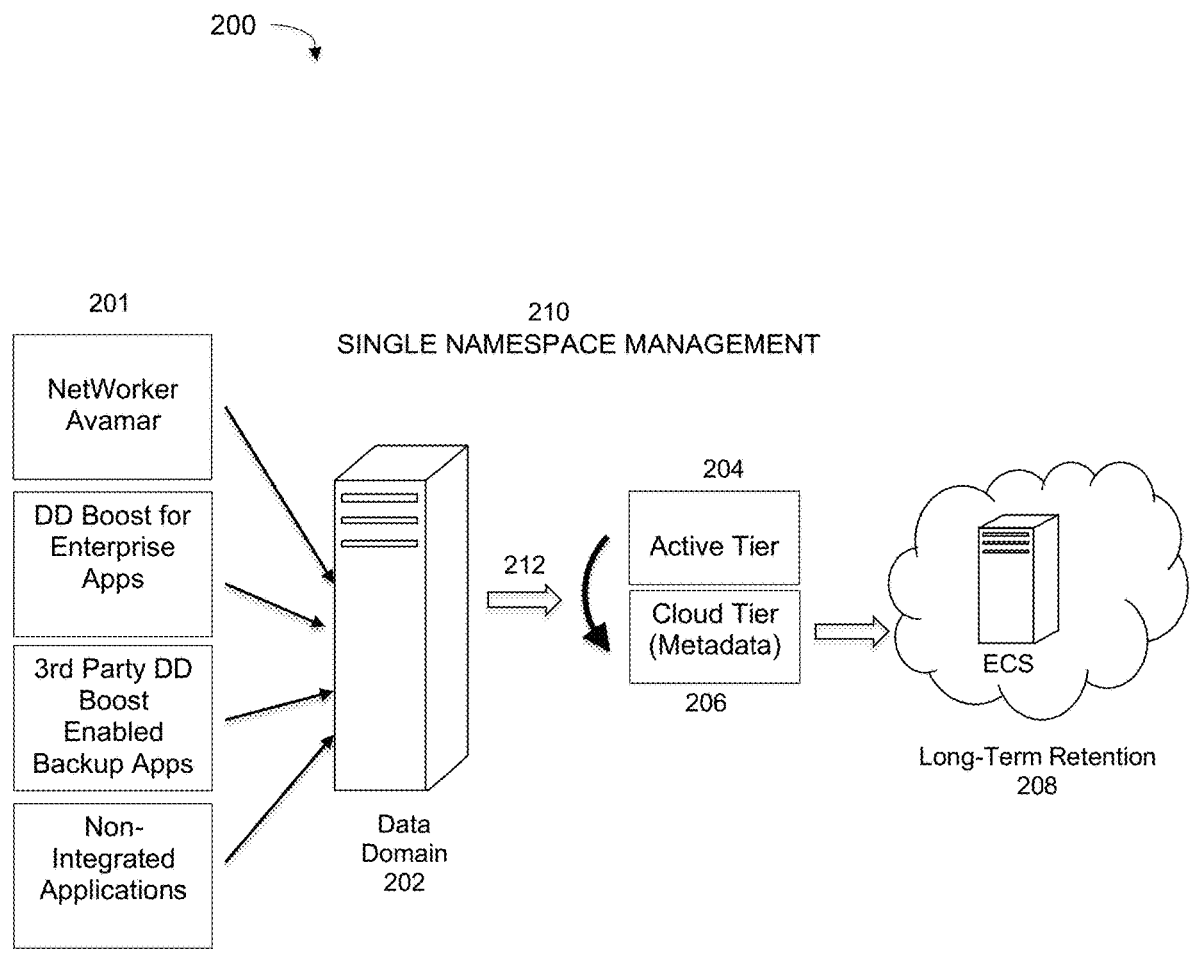
FIG. 2 illustrates an example of single namespace management for an active tier and a cloud tier in a deduplication storage system, under some embodiments.

The EMC Data Domain File System is an example of a multi-tiered deduplication file system that allows files to be moved between cloud storage and active storage tiers, while maintaining one namespace, where the cloud tier is typically associated with long-term storage of data and the active tier is associated with presently processed data. FIG. 2 illustrates an example of single namespace management for an active tier and a cloud tier in a deduplication storage system, under some embodiments. Diagram 200 illustrates a system having a deduplication backup (e.g., Data Domain) server 202 that processes data from a number of applications 201. Server 202 executes a single namespace management process 210 that implements one or more data movement policies 212 to move data from the active tier 204 to the cloud tier 206. The cloud tier is embodied in long-term retention or storage 208 provided by cloud providers, such as Amazon (e.g., Amazon Web Services, AWS) or Microsoft Azure, or any other public or private cloud provider, such as ECS.

For the embodiment of FIG. 2, the data movement between the active and cloud tiers is managed via a single data domain namespace management process or component 210. In general, there is no separate cloud gateway or virtual appliance required. The data movement is supported by the native Data Domain policy management framework. When data is moved from the active tier 204 to the cloud tier 206 (in a recall/replay operation), it is deduplicated again, and is written and stored in object storage in the same native Data Domain deduplicated format. This way, cloud access is optimized or minimized since the data is stored in the cloud storage in the deduplicated (compressed) format. The cloud data movement can run concurrently with garbage collection (GC) processes on the active tier.

Embodiments of an instant replay or recall process for moving a file to a cloud tier in a deduplication file system save the content handle of the file in the cloud tier as an extended attribute in the namespace. This is like saving a copy of the file in the cloud tier, but it is not visible to the customer, as the content handle for the cloud tier is hidden as an internal opaque attribute. This implies that this method is transparent to the applications using Data Domain for their long term retention needs. Some common extended attributes include security related attributes, such as ACLs (Access Control Lists), or any other user provided data such as the original author, project name, type, and so on.

Figure 3:
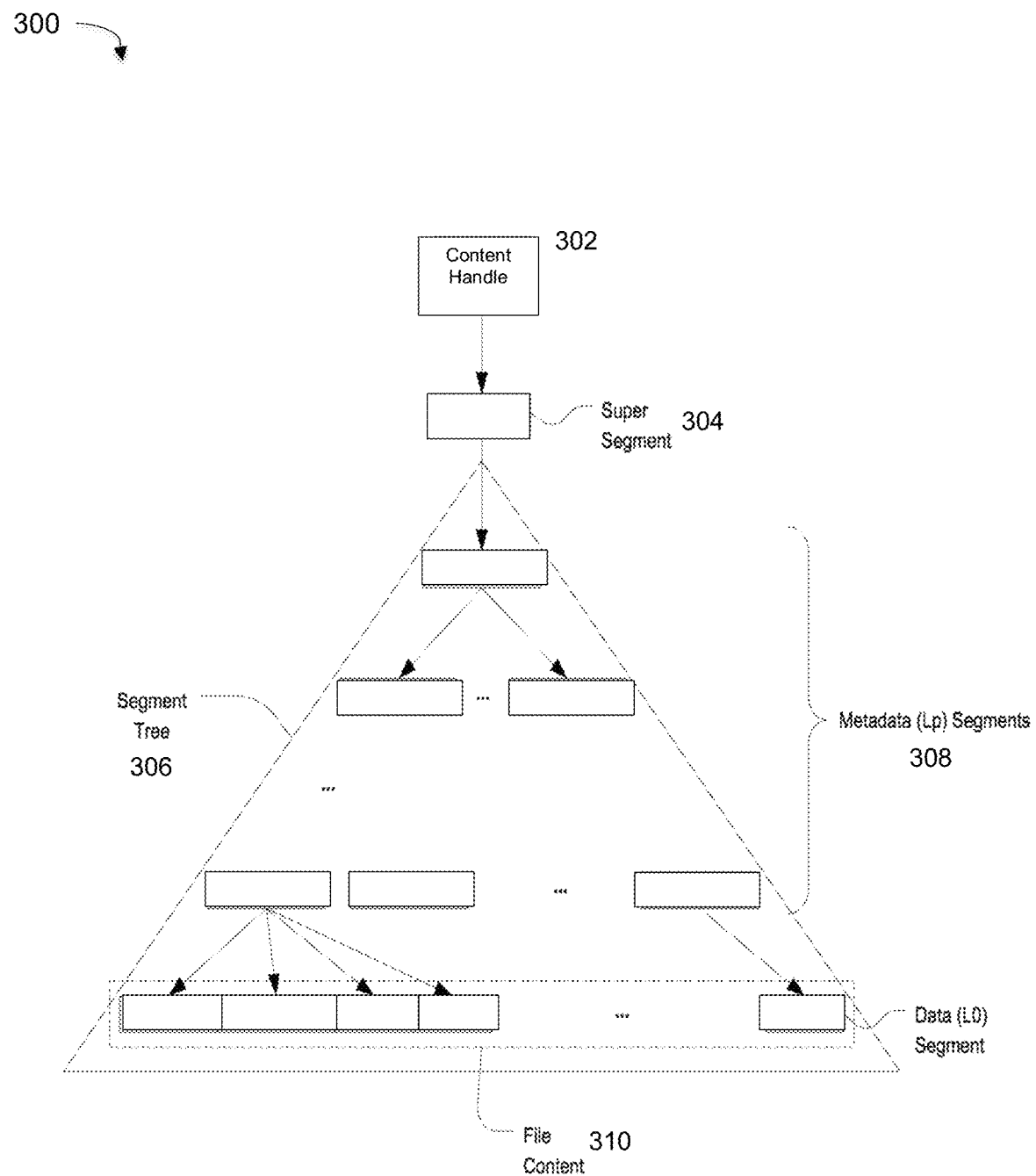
FIG. 3 illustrates the structure of a content handle for use in a single name space process, under an embodiment.

FIG. 3 illustrates the structure of a content handle for use in a single name space process, under an embodiment. As shown in diagram 300, the content handle 302 points to a specific version of the file 310. The leaf nodes in the segment tree 306 are called L0 segments or data segments. The segment tree 306 comprises the metadata (Lp) segments 308. The fingerprints of a group of L0 segments for the file content 310, are collected in the L1 segments. The finger print of a group of L1 segments, is in a L2 segment and so on till L6. L6 is pointed by a super segment 304, which is pointed to by a content handle 302. The content handle is then put in the inode. As is known by Unix users, an inode (Index Node) contains standard file attributes that are needed for all files, such as file ownership, file permissions, file times (creation, access, modification), file size and so on.

Figure 4:
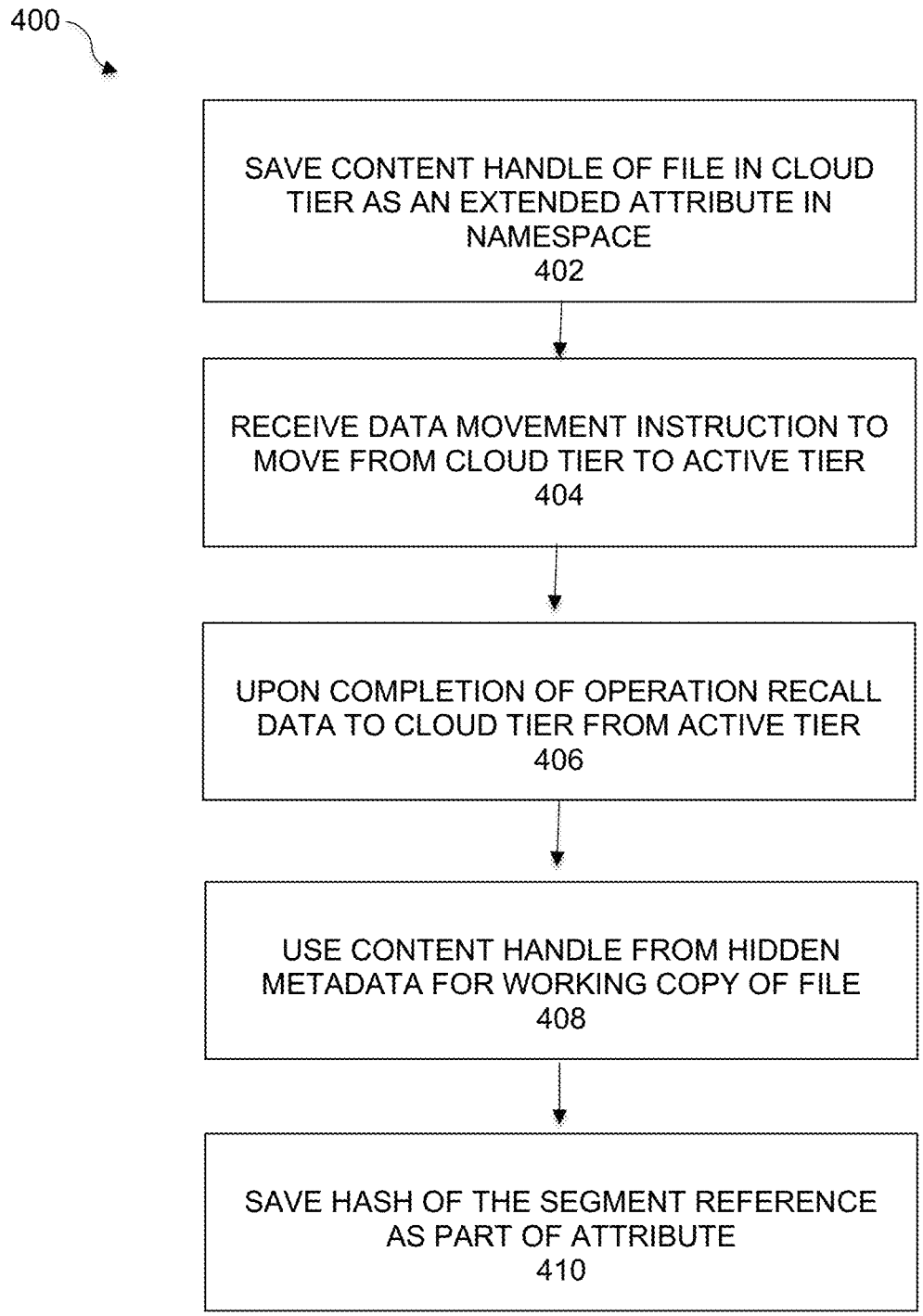
FIG. 4 is a flowchart that illustrates a process of providing instant recall of data from a cloud tier in a single namespace process, under some embodiments.

FIG. 4 is a flowchart that illustrates a process of providing instant recall of data from a cloud tier in a single namespace process, under some embodiments. Process 400 starts by saving the content handle of the file in the cloud tier as an extended attribute in the namespace, 402. The content handle for the cloud tier is hidden as an internal opaque attribute, and operates as a pointer as described above with respect to FIG. 3. In the Data Domain File System, a content handle uniquely identifies a file. The value of the content handle is derived from the contents of a file. If the contents of a file changes, the content handle will also change.

The process receives a command or instruction to move the file data from the cloud tier to the active tier for a desired or required process, such as to copy, modify, view, or any other operation on the data, 404. The user then performs the operation, and once finished, the user instructs or causes the system to move (recall) the data back to the cloud tier from the active tier, 406. The cloud data movement engine of process 120 uses the old cloud content handle from the hidden metadata, and makes it a working copy for the file, 408. This operation essentially instantly restores the file to the cloud tier. It also eliminates the need to run checks like file verification on this copy, as this copy was already validated or verified by the DDFS when it moved the file to the cloud tier.

To make sure that this is the same content as the file in the active tier (i.e., an unmodified active tier copy), the process also saves a hash of the segment reference (part of content handle), 410. This hash will also be saved as part of the attribute that stores the content handle. If the content handle has changed, this instant replay process 400 is not possible. Also, if the namespace is updated with another copy of the handle on the active tier, the process can throw away the cloud content handle (the hidden attribute).

In the case of a disaster or shutdown on the active tier site, the process can recover the cloud copy and thereby save the data from being lost. This requires a "sealed copy" of the namespace to be copied over to the cloud tier. In case the file is not intended to be moved to the cloud tier, the data-movement engine could delete the extra attribute after a cool-off time, thereby cleaning up the space in the cloud tier.

In general, the cloud tier data movement process 400 provides a single name space across all tiers where the file can be in either the active tier or in the cloud tier. As shown in FIG. 2, certain policies 212 may be used to determine conditions where data movement and recall are used. Multiple types of policies may be supported, as follows:
(1) Age-based threshold (e.g., all files older than T days)
(2) Age-range threshold (e.g., all files older than T1 days but younger than T2 days)
(3) Application-driven policy (e.g., set by applications through REST API)
(4) Schedule driven (e.g., daily, weekly, monthly, etc.)
(5) On-demand data movement (e.g., specified MTree, cloud unit, or for all MTrees with a data movement policy).

These policies are listed as examples only, and many other data movement policies may also be used under certain embodiments.

Figure 5:
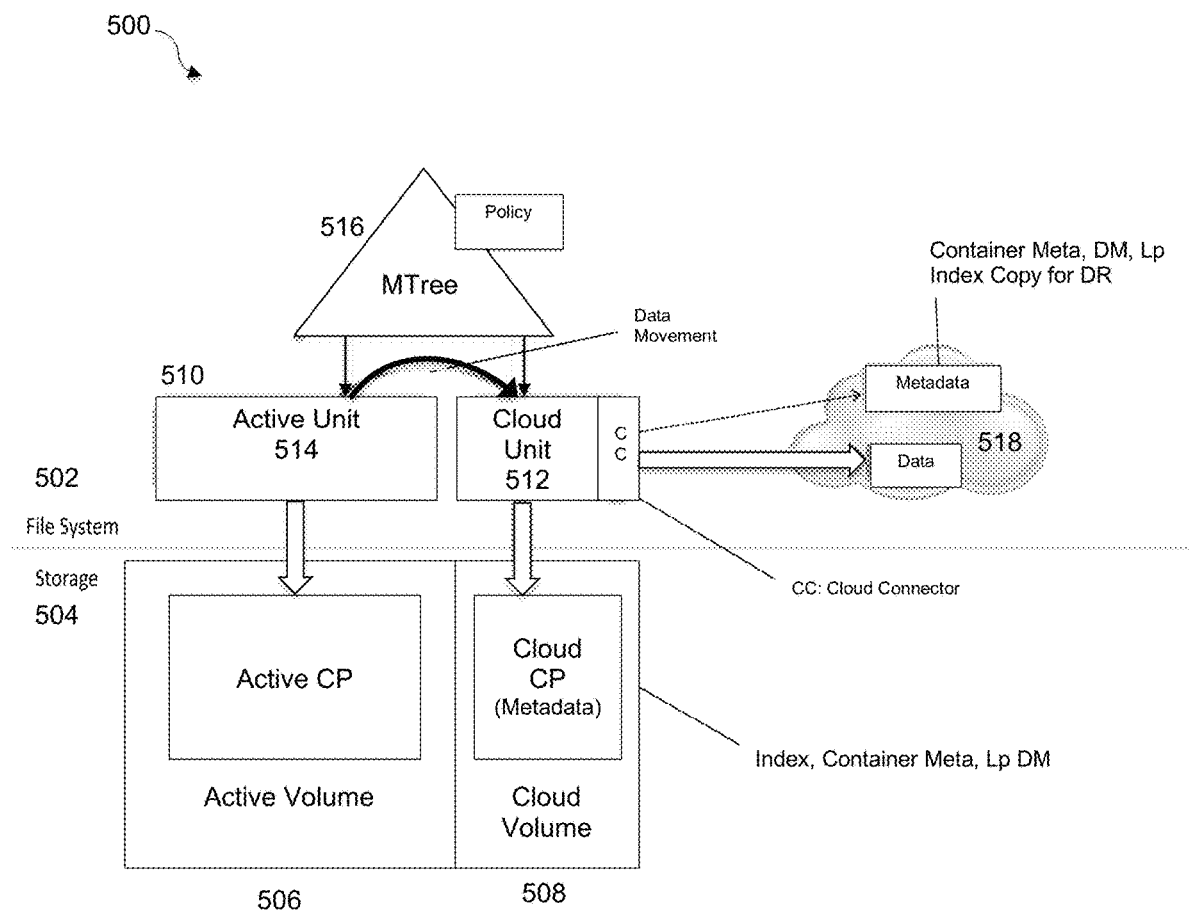
FIG. 5 illustrates cloud tier data movement using a single namespace process, under some embodiments.

FIG. 5 illustrates cloud tier data movement using a single namespace process, under some embodiments. System 500 of FIG. 5 is divided into two main portions, the file system 502 and the storage layer 504. The storage layer 504 comprises an active volume 506 and a cloud volume 508. The file system 502 layer comprises active unit 514 that communicates directly to the active volume 506, and a cloud unit 512 that communicates with the cloud volume 508 and cloud network 518 through a cloud connector (CC). File system 502 also contains Mtree 516. FIG. 5 generally illustrates the high-level on-disk layout of the DDFS file system as may be used under certain embodiments. As illustrated, the metadata generally represents or embodies information about the data processed and stored in the file system. Metadata includes elements such as the length of a file, where on disk a given piece of data is stored, which blocks on disk are used/free and so on.

Figure 6:
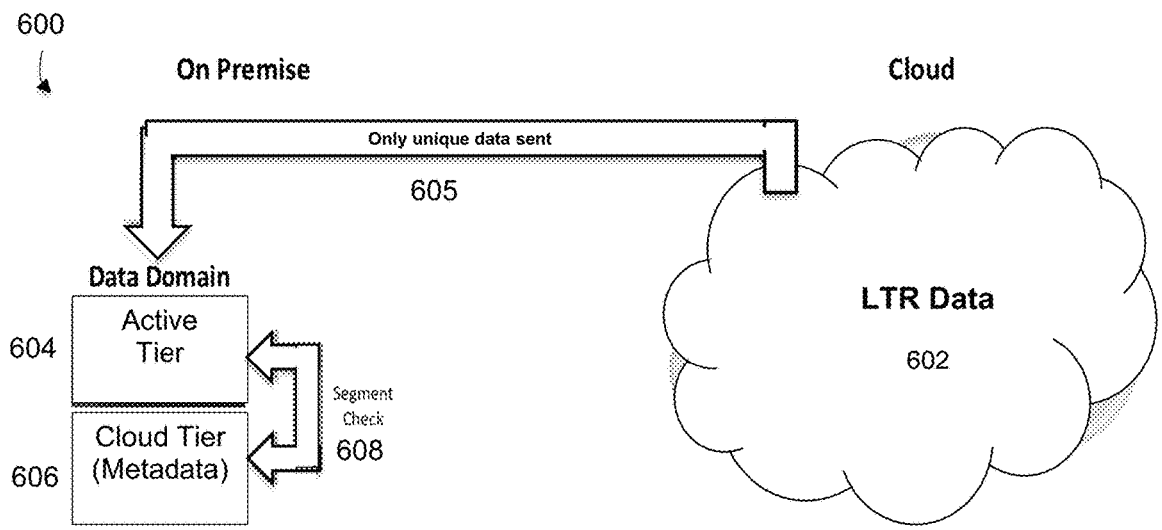
FIG. 6 illustrates the recall of data from the cloud tier in a data domain deduplication system, under some embodiments.

In an embodiment, the cloud tier recall support provides efficient file recall from the cloud. The recall operation can be performed in several different ways, such as:
(1) Recall back to the same file or another file in the active tier
(2) Recall will fail if there is no space to move the file (decision made before any movement is started)
(3) Recall is per file only Other recall processes are also possible. In general, only segments not present in the active tier are invoked for recall from the cloud. FIG. 6 illustrates the recall of data from the cloud tier in a data domain deduplication system, under some embodiments. As shown in diagram 600, long term retained data 602 is moved from long term memory in the cloud to the active tier 604. The deduplication process ensures that only unique data 605 is sent, thus providing efficiency of data transmission. After processing by the user, the process recalls the data from the active tier 604 to the cloud tier 606 after performing a segment check 608. Diagram 600 of FIG. 6 shows that the DDFS tries to minimize sending data that is already present on the cloud tier or active tier. The segment check process 608 shows that any data is always validated through various checksums before it is made visible to the end user.

The embodiments described provide a method and system to have instant replay of a file to the cloud tier on a deduplication filesystem. They help protect customers against data loss in the event of a site failure following a recall of a file from the cloud tier.

System Implementation

Embodiments of the processes and techniques described above can be implemented on any appropriate backup system operating environment or file system, or network server system. Such embodiments may include other or alternative data structures or definitions as needed or appropriate.

Figure 7:
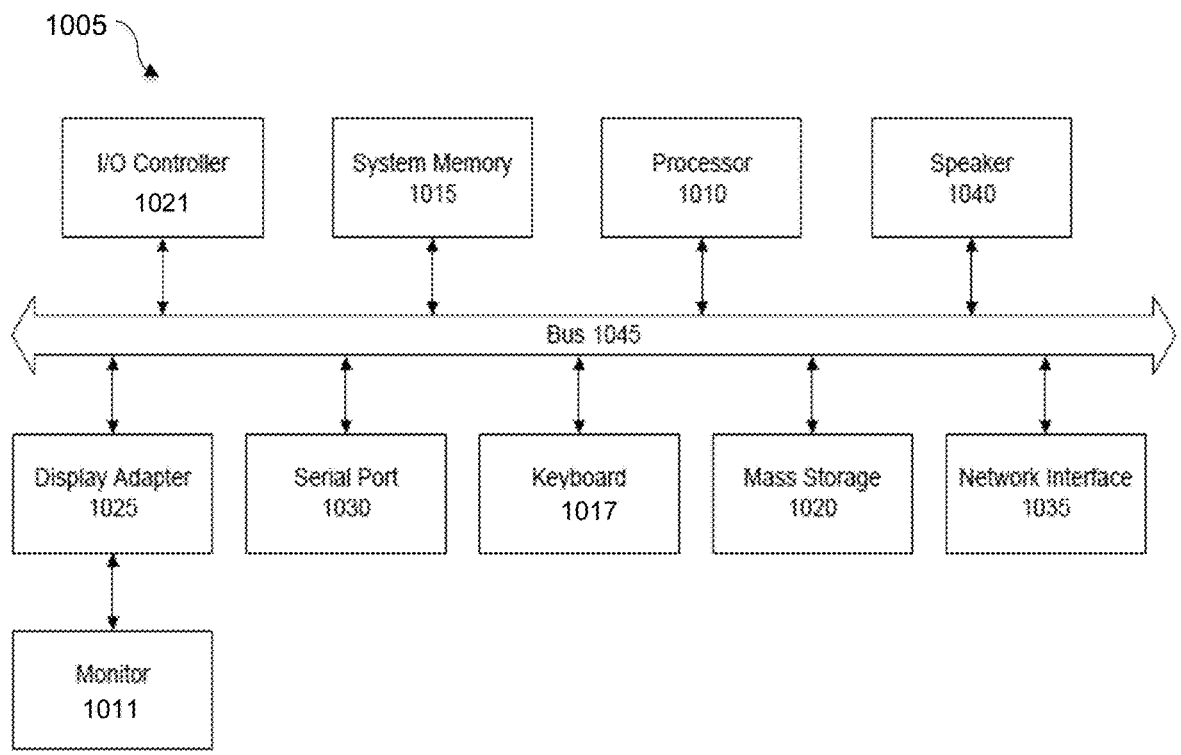
FIG. 7 is a system block diagram of a computer system used to execute one or more software components of the network tuning process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows® family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of processing data in a multi-tier system, comprising:
   saving a content handle of a file in a cloud storage tier as an internal opaque attribute in hidden metadata of a single file system namespace, wherein a value of the content handle is derived from contents of the file such that a change in the content causes the content handle to change to a new content handle from an old content handle;
   receiving an instruction to move the file from the cloud storage tier to an active storage tier for data processing that may modify the file;
   changing the old content handle to the new content handle if the data processing modifies the file;
   upon completion of the data processing, causing the file to be instantly moved back to the cloud storage tier from the active storage tier in an instant recall operation by using the old content handle from the hidden metadata rather than the new content handle as a pointer for a working copy of the file to instantly recall the file to the cloud storage tier, if the data processing does not modify the file;
   saving a hash of a segment reference of the old content handle as part of the extended attribute to verify that the old content handle has not changed between the active storage tier and the cloud storage tier, and preventing the instant recall if the old content handle has changed to the new content handle;
   determining if the namespace is updated with another copy of the old content handle, and if so, deleting the extended attribute; and
   further determining if the file is not to be moved to the cloud tier, and if so, deleting the extended attribute after a defined time period.

2. The method of claim 1 wherein the cloud storage tier comprises storage media resident in a cloud computing network maintained by a cloud service provider, and provided for long term retention of data including the file, and wherein the data processing comprises one of: a view, copy, or modify operation, and further wherein the view and copy operations do not modify the file.

3. The method of claim 2 wherein the active storage tier comprises storage media resident or closely coupled to a server computer executing the data processing on the file.

4. The method of claim 1 wherein the content handle points to a specific version of the file, and wherein content of the file comprises a lower segment of a segment tree.

5. The method of claim 4 wherein leaf nodes in the segment tree comprise L0 segments or data segments, and the segment tree comprises the metadata (Lp) segments.

6. The method of claim 5 wherein fingerprints of a group of Ln−1 segments for the file content are collected in the Ln segments, and wherein an uppermost segment is pointed to by a super segment, which is pointed to by the content handle.

7. The method of claim 6 further comprising putting the content handle in an index node (inode).

8. The method of claim 1 wherein the moving step and recall are performed according to one or more policies.

9. The method of claim 8 wherein the policies comprise one of: age-based threshold of the file; and age-range threshold of the file; an application-driven policy; a schedule driven policy; and an on-demand data movement policy.

10. The method of claim 1 wherein the recall comprises recalling the file back to the same file or another file in the active storage tier.

11. The method of claim 1 wherein the data processing comprises part of a deduplication backup process executed by a data storage server running a Data Domain file system (DDFS).

12. A system for processing data in a multi-tier system, comprising:
- a first processing component saving a content handle of a file in a cloud storage tier as an internal opaque attribute in hidden metadata of a single file system namespace, wherein a value of the content handle is derived from contents of the file such that a change in the content causes the content handle to change to a new content handle from an old content handle;
- a second processing component receiving an instruction to move the file from the cloud storage tier to an active storage tier for data processing that may modify the file; and
- a third processing component, changing the old content handle to the new content handle if the data processing modifies the file, and upon completion of the data processing, causing the file to be instantly moved back to the cloud storage tier from the active storage tier in an instant recall operation by using the old content handle from the hidden metadata rather than the new content handle as a pointer for a working copy of the file to instantly recall the file to the cloud storage tier if the data processing does not modify the file, and saving a hash of a segment reference of the old content handle as part of the extended attribute to verify that the content handle has not changed between the active storage tier and the cloud storage tier, and preventing the instant recall if the old content handle has changed to the new content handle, the third processing component further determining if the namespace is updated with another copy of the old content handle, and if so, deleting the extended attribute, and further determining if the file is not to be moved to the cloud tier, and if so, deleting the extended attribute after a defined time period.

13. The system of claim 12 wherein the cloud storage tier comprises storage media resident in a cloud computing network maintained by a cloud service provider, and provided for long term retention of data including the file, and wherein the active storage tier comprises storage media resident or closely coupled to a server computer executing the data processing on the file, and wherein the data processing comprises one of: a view, copy, or modify operation, and further wherein the view and copy operations do not modify the file.

14. The system of claim 12 wherein the content handle points to a specific version of the file, and wherein content of the file comprises a lower segment of a segment tree, and wherein leaf nodes in the segment tree comprise L0 segments or data segments, and the segment tree comprises the metadata (Lp) segments.

15. The system of claim 14 wherein fingerprints of a group of Ln−1 segments for the file content are collected in the Ln segments, and wherein an uppermost segment is pointed to by a super segment, which is pointed to by the content handle.

16. The system of claim 12 further comprising a policy manager dictating the moving functions of the second processing component.

17. The system of claim 16 wherein the policies comprise one of: age-based threshold of the file; and age-range threshold of the file; an application-driven policy; a schedule driven policy; and an on-demand data movement policy, and wherein the recalling comprises recalling the file back to the same file or another file in the active storage tier.

18. The system of claim 12 wherein the data processing comprises part of a deduplication backup process executed by a data storage server running a Data Domain file system (DDFS).

19. A computer program product, comprising a non-transitory computer-readable medium having a computer-readable program code embodied therein, the computer-readable program code adapted to be executed by one or more processors to implement a method of processing data in a multi-tier system by:
- saving a content handle of a file in a cloud storage tier as an internal opaque attribute in hidden metadata of a single file system namespace, wherein a value of the content handle is derived from contents of the file such that a change in the content causes the content handle to change to a new content handle from an old content handle;
- receiving an instruction to move the file from the cloud storage tier to an active storage tier for data processing that may modify the file;
- changing the old content handle to the new content handle if the data processing modifies the file;
- upon completion of the data processing, causing the file to be instantly moved back to the cloud storage tier from the active storage tier in an instant recall operation by using the old content handle from the hidden metadata rather than the new content handle as a pointer for a working copy of the file to instantly recall the file to the cloud storage tier, if the data processing does not modify the file;
- saving a hash of a segment reference of the old content handle as part of the extended attribute to verify that the old content handle has not changed between the active storage tier and the cloud storage tier, and preventing the instant recall if the old content handle has changed to the new content handle;
- determining if the namespace is updated with another copy of the old content handle, and if so, deleting the extended attribute; and
- further determining if the file is not to be moved to the cloud tier, and if so, deleting the extended attribute after a defined time period.

* * * * *